Jan. 16, 1968  C. P. KOENIG  3,363,726
WHEEL BEARING SEAL PROTECTIVE SHIELD
Filed Jan. 11, 1966

INVENTOR.
CLARENCE P. KOENIG
BY
Warren H. Kintzinger
ATTORNEY

United States Patent Office 3,363,726
Patented Jan. 16, 1968

3,363,726
WHEEL BEARING SEAL PROTECTIVE SHIELD
Clarence P. Koenig, 610 O'Neil St.,
Dubuque, Iowa 52001
Filed Jan. 11, 1966, Ser. No. 519,910
7 Claims. (Cl. 188—18)

ABSTRACT OF THE DISCLOSURE

A wheel bearing seal protective shield primarily for use with heavy duty wheels and brakes not employing brake dust shields and with the wheel brake structures open to cooling air flow. It is a protective shield of cup or bell shape mounted between a brake spider and the wheel hub and bearing assembly with the cup or bell opening facing outward with a rim axial projecting portion of the shield in concentric outside covering spaced relation to the inboard end of the wheel hub.

---

Figure 1:
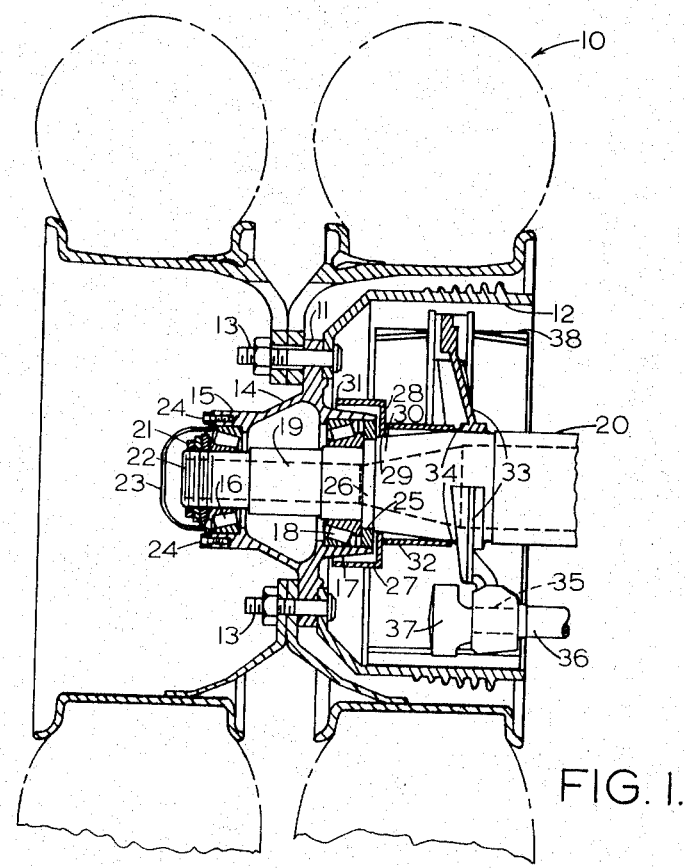

This invention relates in general to wheel bearing seal protection, and in particular, to a wheel bearing seal protective shield positioned between brake mounting structure, such as a brake spider, and the wheel hub and bearing assembly.

Entrance of water along with mud, sand, dirt, or other forms of foreign material into hub cavities of both live (driven) axle wheels and dead (non-driven) axle wheels has proven to be a problem in the trucking industry for years. Water and other foreign matter in various combinations thrown up against the inboard side of truck wheel assemblies during vehicle operation under frequently encountered operational environmental conditions has, much too often, been seeping by wheel bearing inboard oil seals. This, which may be in large measure brought about by splash impinging forces against wheel bearing seals, results in contamination of wheel hub cavity lubricating oil and thereby abrasive erosion and wear of wheel bearing races, rollers, and in some driven wheels various wheel drive components.

Brake dust shields used with some wheel and brake assemblies overcome to some considerable degree these wheel bearing seal contaminate material passing problems. This, however, is in large measure a trading of problems since maximum cooling of brake structure is an absolute must under many conditions of operations. This being the case, with many high performance brakes called upon at times to dissipate tremendous quantities of energy by the dissipation of heat from the brakes at least under conditions encountered through warmer seasons of the year, the wheel brake structures should be as much as possible be open to cooling air flow.

It is, therefore, a principal object of this invention to substantially eliminate, for practical purposes, any significant seepage or other passage of contaminate material through or by wheel bearing seals into wheel hub cavities and to eliminate the resultant wear of wheel bearings.

Another object is to provide a wheel hub bearing seal protective structure providing such benefits without presenting significant material obstruction to the free flow of cooling air into and around the brake structure of a wheel.

Features of this invention useful in accomplishing the above objects include a cup or bell shaped wheel bearing seal protective shield positioned between brake mounting structure, such as a brake spider, and the wheel hub and bearing assembly with cup or bell opening facing outward. Further, the cup or bell shaped shield is provided with a center opening of approximate size for mounting of the shield on the axle housing, or fixed axle (beam or other structure of a dead axle) or on the inboard end of an axle wheel mounting spindle. The shield is mounted in fixed non-rotative position as by welding or possibly by a bolt mounting arrangement. The shield is advantageously positioned in relatively close proximity to, although not in direct contact with the inboard bearing seal mounting end of the wheel hub, and with, preferably, a rim axial projecting portion of the shield cup or bell shape in concentric outside covering relation to the inboard end of the wheel hub.

A specific embodiment representing what is presently regarded as the best mode of carrying out the invention is illustrated in the accompanying drawing.

Figure 2:
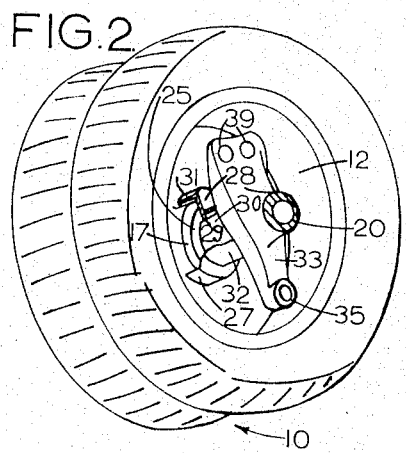
Figure 3:
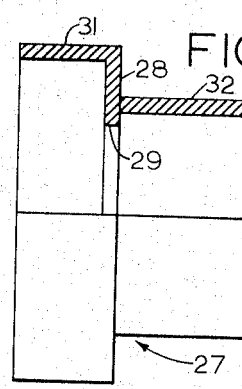

In the drawing:

FIGURE 1 represents a front elevation partially broken away and in section showing a wheel bearing seal protective shield in position in a truck dual wheel and brake assembly mounted on the end of an axle;

FIGURE 2, a perspective view of the dual wheel structure of FIGURE 1 with various items removed and portions broken away and sectioned to further illustrate the shield and its relative position in the wheel and brake assembly; and FIGURE 3 is an enlarged partially broken away and sectioned view of the wheel bearing seal protective shield used in the wheel, brake and axle embodiment of FIGURES 1 and 2.

Referring to the drawing:

The dual wheel assembly 10 of FIGURE 1 is shown to be mounted on hub flange 11 along with brake drum 12 at the inboard side of the flange by nut and bolt assemblies 13. Flange 11 is a radial flange extension of a wheel hub 14, also having an outboard extension 15 enclosing outboard wheel bearing 16 and also an inboard extension 17 enclosing inboard bearing 18. Wheel bearings 16 and 18 mount the wheel assembly 10 for relative rotation on the spindle extension 19 of the rotationally fixed axle member 20. The wheel bearings 16 and 18 and wheel hub 14 with wheel assembly 10 are locked in axial position on axle spindle extension 19 against spindle shoulders by nut and lock nut assembly 21 on the threaded outboard end 22 of the spindle extension. A protective cap 23, covering wheel bearing 16 and the nut assembly 21, is mounted on the outer end of outboard extension 15 by bolts 24 and provides quite adequate protection from invasion of water and other contaminants to the interior of the wheel hub and bearings from the outboard side of the wheel and axle structure.

A wheel bearing seal 25 is also enclosed within wheel hub inboard extension 18 within the outermost inboard end portion thereof, and, in the embodiment shown, is maintained in axial position on shoulder 26 of the axle spindle extension 19. Normally if not subjected to undue direct forces as would be imposed under some operational environmental conditions by splashing water, mud or other foreign matter impinging directly thereupon the seal 25 would function well and protect the hub interior and wheel bearings from invasion by foreign matter. Since, however, ideal operating conditions do not always exist, protection for the wheel bearing seal 25 is provided by protective shield 27.

Shield 27 is cup or bell shaped mounted on an axle member 20 with the cup or bell shape opening facing in the outboard direction. In the embodiment also shown in FIGURE 2 with some parts removed shield 27 includes a plate 28 that is substantially planar and perpendicular to the axis of the axle. Further, referring also to FIGURE 3, plate 28 is provided with a circular opening 29 of such size and concentric position as to provide seating of the plate 28 in the desired longitudinal position on the conical portion 30 of axle member 20 and centering of the shield 27 relative to the axis of the axle. A cylindrical portion 31 of shield 27 projects axially in the outboard direction from shield plate 28 into substantial concentric overlying closely spaced relation with respect to hub inboard extension 17. The shield 27 shown is also equipped with a tubular mounting extension 32 fixed to the back of plate 28 as by weldments, of greater inside diameter than shield plate opening 29, and extending in the inboard direction to give mounting supporting to the shield 27.

The greater inside diameter of shield extension 32 is a size adaptation to the greater diameter of the inboard end of conical portion 30 of axle member 20. At that position in close adjacency to the brake structure mounting brake spider 33 the tubular shield extension 32 is fixed to axle member 20 as by weldments 34. This non-rotatively fixes the shield 27 on the axle member 20 between the brake structure mounting brake spider 33 and the hub 14 of a wheel structure 10 mounted on the axle member 20. This is easily accomplished at most any truck maintenance shop with wheel structure 10 and the wheel hub 14 dismounted from an axle member 20 and using a shield 27 designed for installation on the particular axle involved.

Obviously, the wheels involved could be single wheels in place of the dual wheel 10 shown, and either dead (non-driven) or live (driven) wheel axles. Further, some shield structures in order to conform to various axle, wheel, and brake designs would possibly dispense with the equivalent of tubular extension 32 or require modification thereof with the shield structure still falling within applicant's teachings. With various such embodiments the plate 28 or its equivalent would be welded at opening 29 or its equivalent to the non-rotative equivalent of axle member 20 at the shield mounting location with respect to the various respective wheel and brake mounting arrangements.

It should be noted that various modifications of wheel bearing seal protective shields from the particular cup shaped shield 27 structure shown to a bell shape or other shape with shape blending from the equivalent of plate 28 to an equivalent of cylindrical portion 31 at the outboard end may be used. Such shield variations in shape would be considered to fall within the scope of applicant's teachings. Further, brake spider 33 is shown to rotatably mount in spider journal bearing opening 35, a cam shaft 36 with a dual shoe brake actuating cam head 37 for actuation of brake shoes 38. Shoes 38 are pivotally mounted, at their opposite ends from the cam actuated ends, in dual journal bearing brake shoe anchor openings 39 in spider 33, for pivotal movement into and out of engagement with brake drum 12.

Brake spider 33 is so shaped as indicated by reference to FIGURE 2 that there is considerable space for relatively free cooling air flow into, through, and around the interior brake structure within brake drum 12. This, obviously, is very beneficial under many operational conditions such as encountered with long period sustained or frequent application of brakes while going down a long grade in carrying away heat energy that must be dissipated from brake drum 12 and brake shoes 38 in order to avoid a condition known as brake fading and severely excessive brake lining wear. Further, this also helps in preventing the excessive transmission of undesired heat to a wheel hub, the wheel bearings, bearing seals and wheel lubricant. With the brake assembly interior open to the free flow of cooling air the brake interior, obviously, is open to splash invasion during operation by water, mud, dust, and other forms of contaminant materials. While this has been found not to present a severely adverse problem with respect to brake drum and lining wear with such foreign matter readily working out and away from brake engaging surfaces during operation such conditions have presented severe problems in the passing of foreign material contaminants through and by wheel bearing seals as has been pointed out hereinbefore.

The wheel bearing protective shield 27 is made relatively quite small to minimize any obstruction presented thereby to the relatively free flow of cooling air into and through the interior of the brake drum, and at the same time of adequate proportions to provide the seal protective shielding desired. The shape of shield 27, its non-rotative mounting, and its position relative to the inboard extension 17 of wheel hub 14 are quite significant factors. During operation some contaminant material will be splashed against and back from hub flange 11 to enter the opening between the outboard end of shield extension 31 and hub extension 17. Some of this foreign matter lands on the portion of hub extension 17 in radially overlapped relation relative to shield extension 31 and tends to be thrown by centrifugal force from the hub extension 17 with rotation of the hub during operation. The material thrown from hub extension 17 along with water, mud, and other such contaminants splashed back into and directly upon the interior of shield extension 31 and the outboard side of shield plate 28 tends to flow or gravitate to the bottom of the shield extension 31 and out the outboard end thereof since the shield structure 27 is advantageously non-rotatively mounted on axle member 20.

Whereas this invention is here illustrated and described with respect to a specific embodiment thereof, it should be realized that various changes may be made without departing from the essential contribution to the art made by the teachings hereof.

I claim:

1. A seal protective shield constructed for use in a wheel and brake assembly including non-rotative inboard brake structure and relatively outboard rotative wheel non-rotative mounting means, and seal means between said mounting means and rotative structural means of the wheel: with said seal protective shield adapted for being non-rotatively mounted on said mounting means between brake structure non-rotatively mounted on said mounting means and rotative structural means of the wheel; said shield being provided with a radially extended portion and also an axially extended radially outermost portion connected to the radially extended portion; said axially extended portion extending in the outboard direction from the region of its interconnection with the radially extended portion to an outboard open end of the shield; and with at least part of said axially extended portion of the shield being in radially spaced overlying relation with respect to part of the rotative structural means of the wheel when the shield is mounted in place in a wheel and brake assembly.

2. The seal protective shield of claim 1, wherein said shield is constructed for use with a wheel and brake assembly with rotative structural means of the wheel including an inboard directed extension holding said seal means, and said shield is positioned on said mounting means with the axially extended portion of the shield in at least partial radial overlapping relation to the inboard directed extension of the rotative structural means of the wheel.

3. The seal protective shield of claim 2, wherein the axially extended portion of the shield terminates in an annular rim at the outboard open end of the shield.

4. The seal protective shield of claim 3, wherein the shield is cup shaped opening in the outboard direction, with the radially extended portion being substantially planar and forming a bottom of a cup shape, and with the axially extended portion of the shield being substantially cylindrical in shape extending in the outboard direction from the radially extended portion of the shield.

5. The seal protective shield of claim 3, wherein the non-rotative means is an axle member, and the radially extended portion of the shield is provided with an opening so shaped and positioned as to position the shield on the axle member during assembly in substantially concentric centered relation relative to said inboard directed extension of the rotative structural means of the wheel.

6. The seal protective shield of claim 5, wherein the axle member is a cylindrical axle member, and the shield is equipped with a tubular inboard extended mounting extension extending from a connection with said radially extended portion of the shield.

7. The seal protective shield in the wheel and brake assembly of claim 1, wherein said rotative structural means of the wheel includes a wheel hub; said rotative wheel non-rotative mounting means includes a wheel mounting spindle; wheel bearings rotatably mount said wheel hub and the wheel assembly on said wheel mounting spindle; a brake drum is mounted on said wheel hub; said brake structure includes a brake spider mounting brake drum engaging braking shoes, and brake actuating means for moving said braking shoes into and out of braking engagement with said brake drum; said seal means being a wheel bearing seal; and with the interior of said brake structure being open from the inboard side to the interior flow of brake cooling air flow within the brake drum and around the brake spider.

References Cited
UNITED STATES PATENTS

| | | |
|---|---|---|
| 1,303,066 | 5/1919 | Jeffries. |
| 1,995,691 | 3/1935 | Stough et al. 188—218 |
| 2,711,800 | 6/1955 | Hagen 188—18 |
| 2,791,297 | 5/1957 | Forbush 188—18 X |
| 3,144,100 | 8/1964 | Kay 188—206 X |

DUANE A. REGER, *Primary Examiner.*